United States Patent [19]

Martin

[11] Patent Number: 5,119,912
[45] Date of Patent: Jun. 9, 1992

[54] AUTOMATIC/MECHANICAL APPLY PARK BRAKE DISTRIBUTOR

[75] Inventor: Charles A. Martin, Rochester, Mich.

[73] Assignee: General Motors Corporation, Detroit, Mich.

[21] Appl. No.: 739,764

[22] Filed: Aug. 2, 1991

[51] Int. Cl.⁵ ............................................. B60K 41/26
[52] U.S. Cl. .................... 192/4 A; 192/480 R
[58] Field of Search ............... 192/4 A, 4 R; 74/479, 74/480 R

[56] References Cited

U.S. PATENT DOCUMENTS

| | | | |
|---|---|---|---|
| 2,975,651 | 3/1961 | Fox et al. | 192/4 A X |
| 3,110,363 | 11/1963 | Chapman et al. | 188/69 |
| 3,116,815 | 7/1964 | Chapman | 188/106 |
| 3,780,839 | 12/1973 | Schroeder | 192/4 A |
| 3,912,050 | 10/1975 | Iwanaga et al. | 192/4 A X |
| 3,978,946 | 9/1976 | Ream | 192/4 A |
| 4,246,989 | 1/1981 | Kohler | 192/4 A |
| 4,433,763 | 2/1984 | Lizzio | 192/4 A |
| 4,572,340 | 2/1986 | Pierce | 192/4 A X |
| 4,610,336 | 9/1986 | Kuwayama et al. | 192/4 A |
| 4,979,783 | 12/1990 | Johnson | 192/4 A X |

Primary Examiner—Rodney H. Bonck
Assistant Examiner—Andrea Pitts
Attorney, Agent, or Firm—Ernest E. Helms

[57] ABSTRACT

A light truck or bus-type vehicle is provided which has a spring applied and hydraulic release parking brake actuator and, in addition, provides a mechanical parking brake system. The actuator and the mechanical braking system apply through a parking brake force distributor which allow the parking brake to be actuated by a spring applied hydraulically released actuator or by a manually operated system typically a foot lever.

1 Claim, 1 Drawing Sheet

AUTOMATIC/MECHANICAL APPLY PARK BRAKE DISTRIBUTOR

FIELD OF THE INVENTION

The field of the present invention is that of a parking brake system for a light truck or bus-type vehicle having rear wheel drive.

DISCLOSURE STATEMENT

Larger light trucks and bus vehicles which utilize a truck chassis are typically too heavy to rely upon a parking pawl within the vehicle transmission to provide the park selection for vehicle operation. Most of these vehicles are rear wheel drive-type vehicles which have an engine at a forward end. The engine is connected at its rear end with a transmission which is further connected with a propshaft going to a rear differential and then to the rear axles. To provide the parking brake function there is usually provided on a propshaft a drum and a drum brake. The parking brake is usually applied by an actuator which utilizes a spring to apply the brake and is powered hydraulically to release the same. The hydraulic power which is utilized to release the brake is usually supplied by the pump which is associated with the power steering of the vehicle. To integrate the system the actuator is fitted to the vehicle in such a manner that placement of the transmission in the park position causes the actuator to apply the parking brake. Movement of the transmission from the park position causes the hydraulic release mechanism to actuate to release the brake. Therefore, the system is designed to function in a manner similar to that of smaller vehicles which utilize a pawl within the transmission to provide the parking brake function.

To provide emergency brake operation a button is typically placed upon the vehicle dash allowing the vehicle operator to hit this button to cause the actuator to apply the parking brake.

Although the above system works in a very satisfactory manner there are some attributes of the system which are not as advantageous as desired. The first attribute is that the actuator typically does not apply the brake as fast as that experienced with mechanical-type parking brakes utilized in smaller vehicles since the hydraulic pressure must be given more time to operate the release mechanism. Secondly, when servicing the actuator it is desirable to provide another braking system to steady the vehicle thereby deleting the need to block the vehicle wheels when repairing the actuator.

SUMMARY OF THE INVENTION

To meet the above-described unfulfilled needs and to provide other advantages the present invention is brought forth. The present invention provides a light truck or bus-type vehicle which has a spring applied and hydraulic release parking brake actuator and, in addition, provides a mechanical parking brake system. The actuator and the mechanical braking system apply through a parking brake force distributor which allow the parking brake to be actuated by a spring applied hydraulically released actuator or by a manually operated system typically a foot lever.

It is an object of the present invention to provide a light truck or bus-like vehicle having a parking brake actuated by a spring applied hydraulically released actuator as well as by a manually controlled lever.

Other objects, desires and advantages of the present invention can become more apparent to those skilled in the art as the nature of the invention is better understood from the accompanying drawings and a detailed description.

DETAILED DESCRIPTION OF THE DRAWINGS

Figure 1:
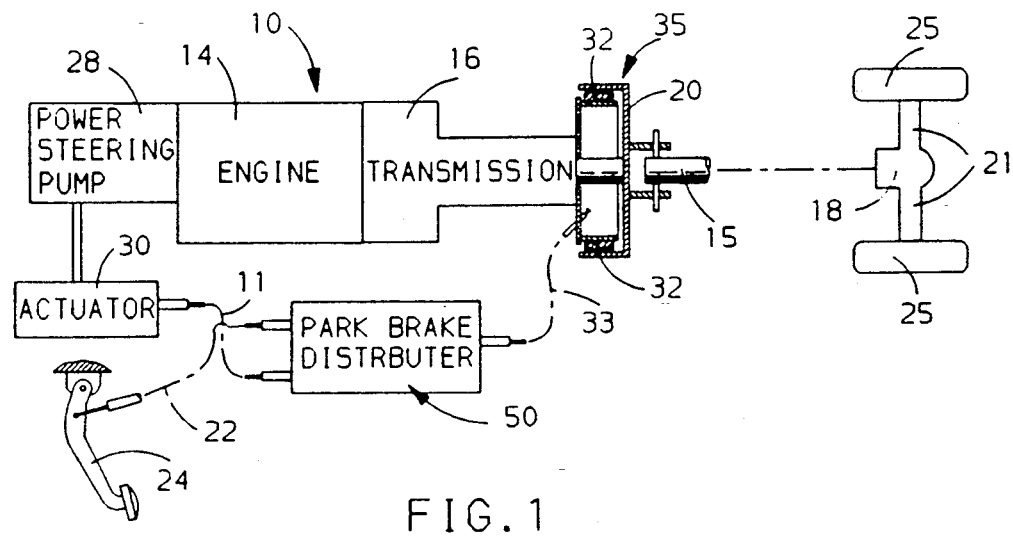
FIG. 1 is a schematic view of a vehicle according to the present invention.
Figure 2:
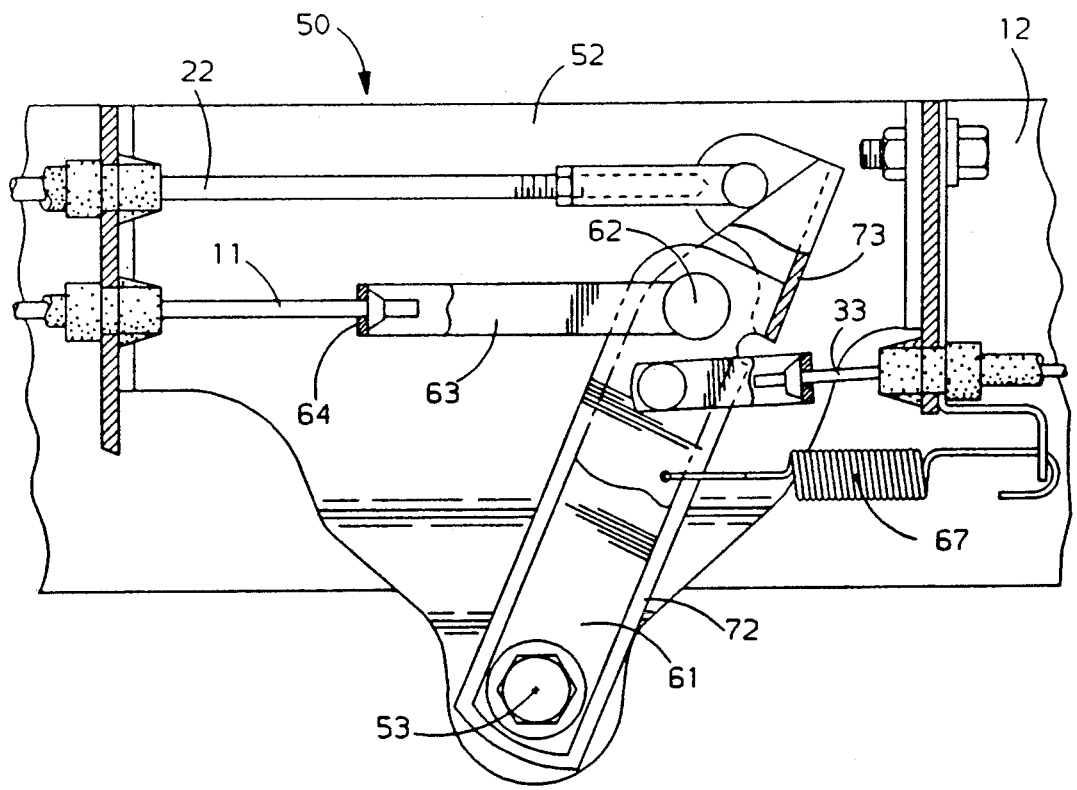
FIG. 2 is a plane elevational view with portions sectioned of a parking brake force distributor according to the present invention.

Referring to FIGS. 1 and 2, a light truck or bus 10 has two (only portion of one shown) beams or channels 12 which form the main frame of the chassis. The powertrain of the vehicle 10 includes an engine 14 which is torsionally connected with a transmission 16 mounted to the frame 12 rearward of the engine 14. The transmission 16 is torsionally associated with a propshaft 15 which extends rearwardly to a differential 18. The differential 18 has extending from it the two drive axles 21 which are connected with the vehicle wheels 25. The vehicle 10 also has a power steering system with an inclusive power steering hydraulic pump 28.

Referring to FIG. 1, connected on the propshaft 15 is a brake drum 20. The brake drum 20 is frictionally engaged by a pair of shoes 32 which are actuated by a third cable 33 which must be pulled to actuate the brake shoes outward. A return spring (not shown) returns the brake shoes 32 to their rest position of nonengagement with the drum 20. The above provides the vehicle with a parking brake 35.

To provide the primary actuating and release means for the parking brake is a spring applied hydraulically powered release parking brake actuator 30. (Often the actuator 30 will be connected to the chassis rearward of brake drum 20.) The workings of the actuator 30 are in correlation with the vehicle transmission such that when the vehicle operator places the vehicle transmission 16 in the park position, the spring apply means provides a tension force to apply the parking brake 35. And when the vehicle is placed in a position other than park, the actuator 30 by virtue of hydraulic power supplied by the power steering pump 28 releases the parking brake 35.

A manual parking brake foot lever 24 is supplied within the operator cab of the vehicle. The parking brake foot lever allows the vehicle operator to apply the brakes independently of the actuator 30.

Between the actuator 30 and the foot lever 24 is a parking brake force distributor 50. The force distributor has a frame 52 fixed to the vehicle frame 12. The distributor frame 52 has a fixed position with respect to the parking brake 35 and is connected to the parking brake by a third cable 33. A first cable 11 connects the distributor 50 with the actuator 30 and a second cable 22 connects the distributor 50 with the manually operated foot lever (Note: the cables 11, 22, 33 are typically stiff wires).

Looking in further detail at the distributor 50 there are first 61 and second links 72. As shown the first 61 and second links 72 have pivotal axis 53 with the distributor frame 52 which are coterminous with one another. The first link 61 has a loss motion type of connection with the first cable 11 provided by a clevice 63 which is pinned 62 to the first link 61. The cable 11 can have sliding motion with respect to clevice end 64 and pull out of the cable 11 is prevented by a washer attracted with the cable 11. In an alternative embodiment (not shown) the first line hooks to the clevice pin 62 and the cable is fixed with the clevice pin 62 and the cable is fixed with the clevice end 64. The first link 61 is also connected with the third cable 33. Additionally, the first link 61 is torsionally biased to place the parking brake 35 in the release position by a spring 67 connected with the distributor frame 52 and hooked to the first link 61.

The second link 72 is connected with the second cable 22 and is controlled thereby. The second link 72 has a contact surface 73 wherein angular movement of the second link 72 resultant of force imparted by the manual parking brake lever 24 beyond a predetermined angular location, causes the contact surface to engage with the first link 61 and causes the first link 61 to pivot along with the second link 72 tensioning the third cable 33 and thereby actuating the parking brake 35.

Since the total length of travel of the manual parking brake system is usually limited by design constraints, it is desirable that the manual parking brake lever 24 immediately upon placement of the operator's foot start to actuate the parking brake 35. Therefore, to allow the first cable to go slack during these periods of operation the loss motion is taken up by relative motion between the cable 11 and clevice end 64. On an alternative embodiment (not shown) the loss motion could be formed by the first cable connecting to a pin held within a slot on the first link.

With the parking brake system on applicant's invention, if desired, the parking brake can be utilized while the transmission is still in the neutral position or the manual parking brake can be utilized when the spring applied hydraulically released actuator is being serviced.

While an embodiment of the present invention has been explained it will be really apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A dual parking brake system for a vehicle with at least rear wheel drive, the vehicle having an engine torsionally connected with a drivetrain having a selectable transmission connected with a propshaft torsionally associated with a drive axle, the vehicle also having a power steering system with an inclusive power steering hydraulic pump, the system comprising:

a brake drum joined with the propshaft;

braking means for selective frictional engagement with the brake drum;

spring apply, hydraulically powered release parking brake actuator means for automatically applying the braking means when the vehicle is in a preselected position and for automatically releasing the braking means when the vehicle transmission is in a different preselected position;

first cable means for transmission of tension force from the actuator means to the braking means;

operator controlled parking brake lever means to manually apply the braking means independent of the actuator means;

second cable means for transmission of tension force from the parking brake lever means to the braking means;

a parking brake forced distributor for transmitting tension force from the actuator means or the parking brake lever means to the braking means, the distributor having a fixed position with respect to the braking means and the distributor being connected with the braking means by a third cable means and the distributor being connected to the actuator means via the first cable means and the parking brake lever means via the second cable means, the distributor including:

a frame fixed with respect to the vehicle;

a first link pivotally connected with the frame and having a loss motion means of connection with the first cable means and another connection with the third cable means wherein angular movement of the first link by the actuator means via the first cable means causes transmission of tensional force to the third cable means to apply the braking means;

spring means torsionally biasing the first link in a direction to prevent the first link from tensioning the third cable means; and a second link with a contact surface, the second link being pivotally connected with the frame and being connected with the second cable means wherein angular movement of the second link, resultant of force imparted by the parking brake lever means, beyond a predetermined angular location causes the contact surface to engage the first link and cause the first link to have pivotal movement to tension the third cable means to actuate the braking means.

* * * * *